3,350,408
PRODUCTION OF SULFUR-CONTAINING HETEROCYCLIC COMPOUNDS
Russell L. Hodgson, Walnut Creek, Calif., assignor to Shell Oil Company, New York, N.Y., a corporation of Delaware
No Drawing. Filed Dec. 14, 1965, Ser. No. 513,831
6 Claims. (Cl. 260—327)

This invention relates to an improved method for the production of certain sulfur-containing heterocyclic compounds.

The reaction of elemental sulfur with olefinic hydrocarbons to produce sulfur-containing heterocyclic compounds is known in the art. For example, Luttringhaus et al., Ann., 560, 201(1948), described the reaction of propylene with elemental sulfur at relatively low temperature, i.e., 175–225° C., to produce an approximately 1% yield of 1,2-dithiole-3-thione, alternatively herein termed trithione, which has the following formula:

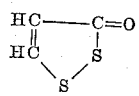

The co-pending application of Hodgson, U.S. Ser. No. 443,617 filed Mar. 29, 1965, discloses an improved method for the production of certain trithiones by reaction of sulfur with hydrocarbons having a reactant moiety of no more than three carbon atoms which possess hydrogen substituents and each carbon atom of the reactant moiety has no more than one non-hydrogen substituent.

It is an object of the present invention to provide an improved process for the production of certain sulfur-containing heterocyclic compounds. More particularly, it is an object to provide a process for the production of 2H-thiopyran-2-thione and thieon[2,3-d]trithione.

It has now been found that these objects are accomplished by the process of contacting straight-chain $C_5$-hydrocarbons with elemental sulfur at an elevated reaction temperature. The process of the invention results in the formation of 2-methylthiophene as the major product, but also results in the formation of substantial amounts of thieno[2,3-d]trithione, believed to be a novel compound, and 2H-thiopyran-2-thione, a compound previously prepared only by an elaborate synthesis employing relatively expensive starting materials.

The hydrocarbon reactant is a straight-chain $C_5$-hydrocarbon having at least one terminal methyl group and from 0 to 2 ethylenic linkages, i.e., carbon-carbon double bonds, as the only unsaturation present within the molecule. These hydrocarbons are n-pentane, 1-pentene, 2-pentene and 1,3-pentadiene. As the sulfur-containing products exhibit a high degree of carbon-carbon unsaturation, the preferred $C_5$-hydrocarbon reactants are ethylenically unsaturated and 1,3-pentadiene and pentene are preferred over pentane as the hydrocarbon reactant. Particularly preferred is pentene.

In the process of the invention, the $C_5$-hydrocarbon is reacted with elemental sulfur in the vapor phase at controlled elevated reaction temperature. Although the process is adaptable for a batch-type operation, the efficiency of the process allows short reaction times to be employed and the process is most suitably conducted in a continuous manner, as in a tubular flow reactor. In one modification, the hydrocarbon reactant and sulfur are mixed prior to or simultaneously with introduction into the reactor. In this modification, best results are obtained when the reactants have been preheated and are in the vapor phase at the time of mixing. It may also be desirable to employ an inert carrier gas such as nitrogen, argon, helium, steam or the like to facilitate passage of the reaction mixture through the reactor.

In an alternate modification, the sulfur is formed in situ as by reaction of hydrogen sulfide and sulfur dioxide. In this modification, a two stage reactor is typically employed, the first stage of which is utilized for sulfur generation and the gaseous sulfur therein produced is passed to the second stage wherein it is contacted with the hydrocarbon reactant to effect the desired conversion. In this modification, hydrogen sulfide and sulfur dioxide are introduced into the initial reactor stage which is preferably packed with particulate solid material, e.g., alumina, silica, crushed brick, glass helices or the like, to promote a more even heat transfer and provide surface. The gaseous reactants are maintained at an elevated temperature, e.g., from about 400° C. to about 450° C. during passage through the sulfur generation zone to promote a more rapid rate of sulfur formation and to maintain the sulfur product in the vapor phase. In such an in situ production of sulfur, the hydrogen sulfide and sulfur dioxide are employed in any convenient ratio. No apparent advantage is gained by the utilization of other than stoichiometric amounts, and the use of substantially stoichiometric proportions, i.e., a molar ratio of hydrogen sulfide to sulfur dioxide of about 2:1, is preferred. The in situ production of sulfur is conducted at any convenient pressure and pressures from about 0.5 atmosphere to about 5 atmospheres are satisfactory. As previously stated, the effluent from the initial reaction zone wherein sulfur is produced is suitably passed directly to a second reaction zone wherein the sulfur is to be contacted with the hydrocarbon reactant. It should be appreciated that in the in situ formation of sulfur as is described above, water is also formed as a product. The presence of water in the reaction zone wherein sulfur and the hydrocarbon reactant are contacted does not appear to be detrimental and it is not necessary to remove the water from the initial reaction zone effluent before contacting the effluent with the hydrocarbon reactant.

Largely because of the availability of elemental sulfur and the low cost thereof, the modification wherein sulfur is employed directly is preferred over the modification wherein sulfur is produced in situ.

Regardless of the manner of sulfur provision, it is generally preferred to employ an excess of the sulfur during the reaction with hydrocarbon to produce the heterocyclic sulfur-containing products in order to facilitate more extensive hydrocarbon conversion. The optimum amount of sulfur to be employed will in part depend upon the type of hydrocarbon reactant, that is, whether the hydrocarbon is saturated or contains 1 or 2 ethylenic linkages. Stoichiometric considerations of the reaction would predict the necessity of providing at least 4 gram-atoms of sulfur for each mole of $C_5$-hydrocarbon. However, it is on occasion desirable to employ ratios of gram-atoms of sulfur to moles of $C_5$-hydrocarbon as low as about 2:1 or as high as about 20:1. Ratios of gram-atoms of sulfur to moles of $C_5$-hydrocarbon of from about 5:1 to about 15:1 are preferred. It is also, on occasion, desirable to employ an inert carrier gas such as nitrogen, argon, helium, steam or the like to facilitate passage of the reaction mixture through the reactor.

The temperature at which the sulfur and hydrocarbon reactant are contacted has been found to be of some importance. The use of a reaction temperature that is too low results in an unnecessarily low conversion of hydrocarbon reactant and consequent low yields of product. Alternatively, however, the use of a reaction temperature that is too high results in a diminution of selectivity to desired products which is not compensated by the increased conversion obtained, so that the yield of the desired heterocyclic products is effectively decreased. Good results are obtained when a reaction temperature from about 400° C. to about 600° C. is employed. For particularly satisfactory results, the utilization of reaction temperatures from about 425° C. to about 550° C. is preferred.

The efficiency of the present process is not dependent upon utilization of any particular reaction pressure, except insofar as the pressure under which the gaseous reactants are introduced to the reaction zone will influence the residence time and hence the reactant contact time in a reaction zone of any given volume. Little advantage is obtained by employing pressures other than about atmospheric pressure and the reaction is preferably conducted at a pressure that is substantially atmospheric, that is, a pressure of from about 0.5 atmosphere to about 5 atmospheres. Utilizing such pressures, reactant contact times of from about 0.1 second to about 8 seconds are obtainable in a reaction zone of moderate size and such reactant contact times are satisfactory. Preferred, however, are reactant contact times of from about 0.5 second to about 5 seconds.

Subsequent to reaction, the effluent from the reaction zone is customarily at least partially condensed to provide a product mixture from which the desired products are separated and recovered by conventional means such as fractional distillation, fractional crystallization, selective extraction or the like.

Example I

A series of runs was conducted wherein various straight-chain $C_5$-hydrocarbons were reacted with sulfur. The apparatus employed was a two-stage vycor reactor of approximately 100 ml. volume in each stage. The stages were thermally independent and each was heated in a vertically-mounted furnace. Molten elemental sulfur together with nitrogen carrier gas was introduced into the first stage maintained at 500° C. where the sulfur was vaporized. The gaseous effluent from this stage was passed to the second stage where it was mixed with preheated $C_5$-hydrocarbon and additional nitrogen. The effluent from the second stage was passed to an unheated trap where most of the normally-solid product was collected. The product carried over by the gas stream was recovered by scrubbing with benzene which was then removed by distillation under reduced pressure. The combined trap and scrubber products were fractionally distilled at reduced pressure and crystallized to afford methylthiophene, B.P. 110° C., 2H-thiopyran-2-thione, M.P. 64° C., and thieno[2,3-d]-trithione, M.P. 128° C. Alternatively the composition of the product mixture was determined by gas-liquid chromatographic and mass spectrometric analyses.

The results of this series are shown in Table I wherein the yield of the products is based on the hydrocarbon charged.

TABLE I

| Run | 1 | 2 | 3 | 4 | 5 |
|---|---|---|---|---|---|
| Feed | Pentane | 2-pentene | 2-pentene | 1,3-pentadiene | 1,3-pentadiene |
| S/Feed, mole/mole | 9.6 | 6.3 | 12.2 | 4.8 | 9.6 |
| Temp., °C | 550 | 500 | 500 | 500 | 500 |
| Residence Time, sec | 2-3 | 2-3 | 1 | 2-3 | 1 |
| Conversion of Feed, percent | 45 | 100 | 100 | 100 | 100 |
| Yield, percent: | | | | | |
| 2-methylthiophene | 12 | 38 | 21 | 29 | 18 |
| 2H-thiopyran-2-thione | 6 | 9 | 15 | 15 | 6 |
| Thieno[2,3-d]trithione | 3 | 1 | 3 | 2 | |

The products of the invention comprise thieno[2,3-d]trithione and 2H-thiopyran-2-thione, which respectively have the following formulas.

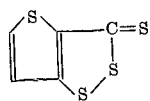

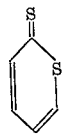

Also observed as a product is 2-methylthiophene. The products find utility as corrosion inhibitors and as extreme pressure additives in lubricating oils and the like.

To further illustrate the improved process of the invention, the following examples are provided. It should be understood that the details thereof are not to be regarded as limitations, as they may be varied as will be understood by one skilled in this art.

I claim as my invention:
1. The process of intimately contacting straight-chain $C_5$-hydrocarbon of at least one terminal methyl group and of from 0 to 2 ethylenic linkages with from about 2 moles to about 20 moles of sulfur per mole of said hydrocarbon, in the vapor phase at a temperature from about 400° C. to about 600° C.
2. The process of claim 1 wherein the hydrocarbon is 1,3-pentadiene.
3. The process of claim 1 wherein the hydrocarbon is pentene.
4. The process of claim 1 wherein the hydrocarbon is pentane.
5. The process of claim 1 wherein the $C_5$-hydrocarbon is contacted with from about 5 moles to about 15 moles of sulfur per mole of hydrocarbon.
6. The process of claim 5 wherein the temperature is from about 425° C. to about 550° C.

References Cited

UNITED STATES PATENTS

| 2,410,401 | 10/1946 | Coffman | 260—329 |
| 2,535,706 | 12/1950 | Stevens et al. | 260—327 |
| 2,748,144 | 5/1956 | Hanson et al. | 260—329 |

J. PATTEN, *Primary Examiner.*